United States Patent
Chen et al.

(10) Patent No.: US 9,711,961 B2
(45) Date of Patent: Jul. 18, 2017

(54) PROTECTION DEVICE WITH COMMUNICATION BUS FAULT DIAGNOSIS FUNCTION, SYSTEM AND METHOD

(71) Applicant: Siemens Aktiengesellschaft, Munich (DE)

(72) Inventors: Wei Gang Chen, Shanghai (CN); Mario Dankert, Raguhn-Jessnitz (DE); Feng Du, Shanghai (CN); Yue Zhuo, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 428 days.

(21) Appl. No.: 14/533,210

(22) Filed: Nov. 5, 2014

(65) Prior Publication Data

US 2015/0200538 A1 Jul. 16, 2015

(30) Foreign Application Priority Data

Jan. 16, 2014 (CN) .......................... 2014 1 0020451

(51) Int. Cl.
*H02H 3/00* (2006.01)
*H02H 7/30* (2006.01)
*H02H 3/027* (2006.01)

(52) U.S. Cl.
CPC .............. *H02H 7/30* (2013.01); *H02H 3/027* (2013.01)

(58) Field of Classification Search
USPC .......................................................... 361/64
See application file for complete search history.

(56) References Cited

U.S. PATENT DOCUMENTS

| 5,185,736 | A | * | 2/1993 | Tyrrell | H04J 3/08 370/358 |
|---|---|---|---|---|---|
| 6,055,145 | A | * | 4/2000 | Lagree | G06J 1/00 361/115 |
| 6,295,570 | B1 | * | 9/2001 | Clemens | G06F 13/102 710/107 |
| 6,297,939 | B1 | | 10/2001 | Bilac et al. | |
| 6,735,728 | B1 | * | 5/2004 | Tiedemann | G06F 11/221 714/712 |
| 9,432,298 | B1 | * | 8/2016 | Smith | H04L 49/9057 |
| 2004/0201279 | A1 | * | 10/2004 | Templeton | H02J 1/102 307/11 |
| 2007/0135971 | A1 | | 6/2007 | Andarawis et al. | |

(Continued)

FOREIGN PATENT DOCUMENTS

| CN | 102709889 A | 10/2012 |
|---|---|---|
| CN | 103311904 A | 9/2013 |
| EP | 0119744 A1 | 9/1984 |

*Primary Examiner* — Ronald W Leja

(74) *Attorney, Agent, or Firm* — Harness, Dickey & Pierce, P.L.C.

(57) ABSTRACT

A method is disclosed for diagnosing faults on a communication bus used to transmit zone selective interlocking signals in a power distribution network. The method includes configuring interfaces of all protection devices connected to the same communication bus to be input ports within a first diagnosis time period; detecting, at each protection device connected to the communication bus, an input signal received by the input port thereof; and if abnormality is detected in the input signal, the protection device issuing a first alert associated with the corresponding interface.

25 Claims, 13 Drawing Sheets

(56) References Cited

U.S. PATENT DOCUMENTS

| | | | |
|---|---|---|---|
| 2008/0198521 A1 | 8/2008 | Weiher et al. | |
| 2014/0319929 A1* | 10/2014 | Chen | H01H 9/54 307/115 |
| 2014/0343779 A1* | 11/2014 | Gonzalez | G06F 11/221 701/22 |
| 2015/0092309 A1* | 4/2015 | Chen | H02H 3/28 361/64 |
| 2015/0199225 A1* | 7/2015 | Chen | G06F 11/079 714/37 |
| 2015/0200538 A1* | 7/2015 | Chen | H02H 7/30 361/64 |
| 2015/0248935 A1* | 9/2015 | Moshayedi | G11C 5/14 711/103 |

* cited by examiner

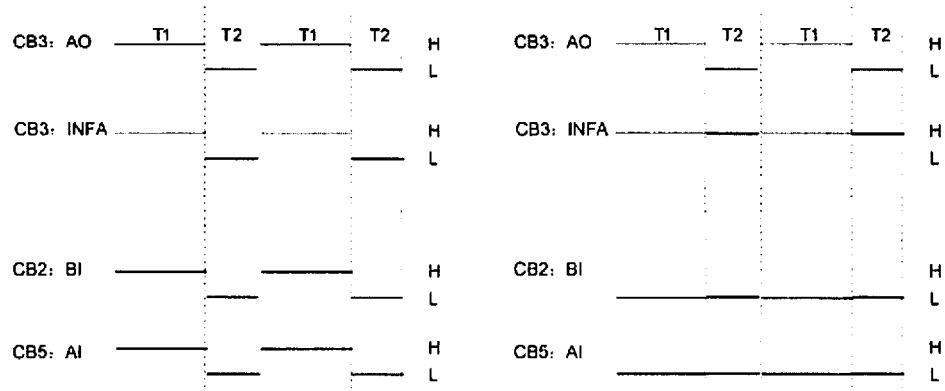
Fig. 8A  BUS2 - normal
Fig. 8B  BUS2 - short circuit
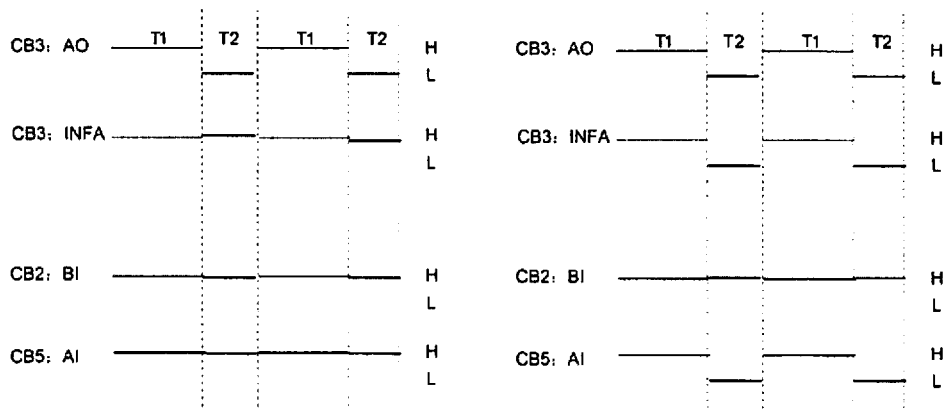
Fig. 8C  BUS2 open circuit near CB3
BUS2 open circuit near CB2
Fig. 8D
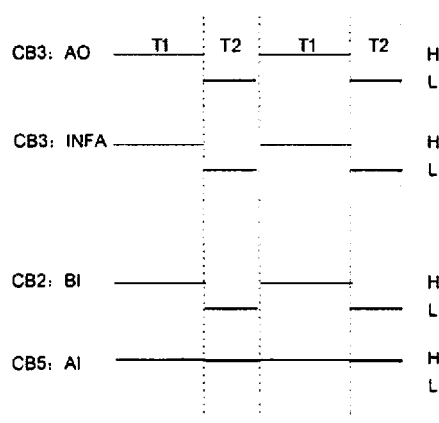
BUS2 open circuit near CB5   Fig. 8E

PROTECTION DEVICE WITH COMMUNICATION BUS FAULT DIAGNOSIS FUNCTION, SYSTEM AND METHOD

PRIORITY STATEMENT

The present application hereby claims priority under 35 U.S.C. §119 to Chinese patent application number CN 201410020451.1 filed Jan. 16, 2014, the entire contents of which are hereby incorporated herein by reference.

FIELD

At least one embodiment of the present invention relates in general to power distribution network protection, in particular to a protection device for e.g. a circuit breaker in a power distribution network, wherein the protection device has, for example, zone selective interlocking functionality.

BACKGROUND ART

In a power distribution system, switches (e.g. circuit breakers) are generally relied upon to make or break power supply connections in the system, and in particular to break the power supply connection from a power source to an electrical load. These switches are designed for a rated current, and cut off the current flowing through them in the event of a fault such as a short circuit to ground, i.e. break the power supply connection.

It is generally desired that in the event of a fault, only the power supply connection associated with or closest to the fault is broken; this is referred to as zone selective breaking, or zone selective interlocking (ZSI). Specifically, supposing that a short circuit to ground fault occurs in a multi-stage power distribution network supplied with power by a single source, then each circuit breaker which detects the fault must transmit an interlocking signal (ZSI signal) to the circuit breaker upstream of itself. Thus, only those circuit breakers which do not receive a ZSI signal are determined as being closest to the fault point and execute instantaneous protection (e.g. with a delay time t=50 ms), i.e. perform the breaking action with the shortest time delay. Those circuit breakers which receive a ZSI signal execute timed protection, i.e. are "locked". By "timed protection" or "locking" is meant that: if the fault is still not eliminated when a predetermined delay time (e.g. 100 ms) expires (e.g. if the protecting action of a circuit breaker closer to the fault point fails), then the circuit breaker will break the circuit, otherwise it will maintain the connection.

The simple ZSI described above is not suitable for a power distribution network with multiple power sources, owing to the increased complexity of the network. Thus, directional zone selective interlocking (DISI) has been proposed. Chinese patent application No. 201310150057.5, submitted on Apr. 26, 2013, has disclosed a method and device for implementing directional zone selective protection. According to the disclosure in that patent application, ZSI signals are transmitted to different circuit breakers selectively according to the direction of current flow through the circuit breaker in question. The advantage of this approach is that, even if there are multiple power sources or active loads in the network, selective protection can be achieved more reliably.

Regardless of whether a ZSI method or DZSI method is used, ZSI signals are transmitted along communication paths between protection devices of the various circuit breakers. Thus, the normal operation of a communication path which transmits ZSI signals becomes a prerequisite for implementing zone selective interlocking.

SUMMARY

An embodiment of the present invention is directed to a method for diagnosing whether a communication path for transmitting ZSI signals is normal, as well as an associated protection device. The method and protection device can be connected to an existing ZSI circuit breaker, without changing the structure of the electronic trip unit of the existing circuit breaker, and can realize distributed DZSI management. Thus, when such a protection device is employed, there is no need to alter the existing ZSI circuit breaker; ZSI communication path diagnosis and alerting can be realized by connecting the protection device externally.

An embodiment of the present invention reduces the complexity of circuitry in the protection device, as well as reducing the independent power supply provided for the device, in order to reduce the volume of the protection device and lower the cost thereof.

According to one embodiment of the present invention, the present invention proposes a protection device for a switch in a power distribution network. The protection device is connected to a protection device of at least one other switch via at least one communication bus, the protection device comprising: a first interface capable of being connected to a first communication bus; a first controlled switch pair connected to the first interface, for configuring the first interface to be an output port or an input port in response to a control signal; a first control unit, for controlling the first controlled switch pair such that the first interface is configured to be an input port within a first diagnosis time period, and for issuing a first alert signal if an input signal from the first interface is abnormal within the diagnosis time period; wherein an interface of each protection device connected to the first communication bus is configured to be an input port within the first diagnosis time period.

According to another aspect of an embodiment of the present invention, an embodiment of the present invention proposes a method for diagnosing faults on a communication bus used to transmit zone selective interlocking signals in a power distribution network, wherein the power distribution network comprises two or more switches, each switch being configured with a protection device, the protection device exchanging ZSI signals with a protection device of at least one other switch via at least one communication bus, the method comprising: configuring interfaces of all protection devices connected to the same communication bus (BUS1, BUS2) to be input ports within a first diagnosis time period; at each protection device connected to the communication bus, detecting an input signal received by an input port thereof; if abnormality is detected in the input signal, the protection device issuing a first alert associated with the corresponding interface.

BRIEF DESCRIPTION OF THE ACCOMPANYING DRAWINGS

The objects, characteristics, features and advantages of the present invention will be made more obvious by the following detailed description of example embodiments, which refers to the accompanying drawings.

FIGS. 8A-8E show waveform diagrams of alert signals according to an embodiment of the present invention in the scenario shown in FIG. 3;

DETAILED DESCRIPTION OF EXAMPLE EMBODIMENTS

Figure 1:
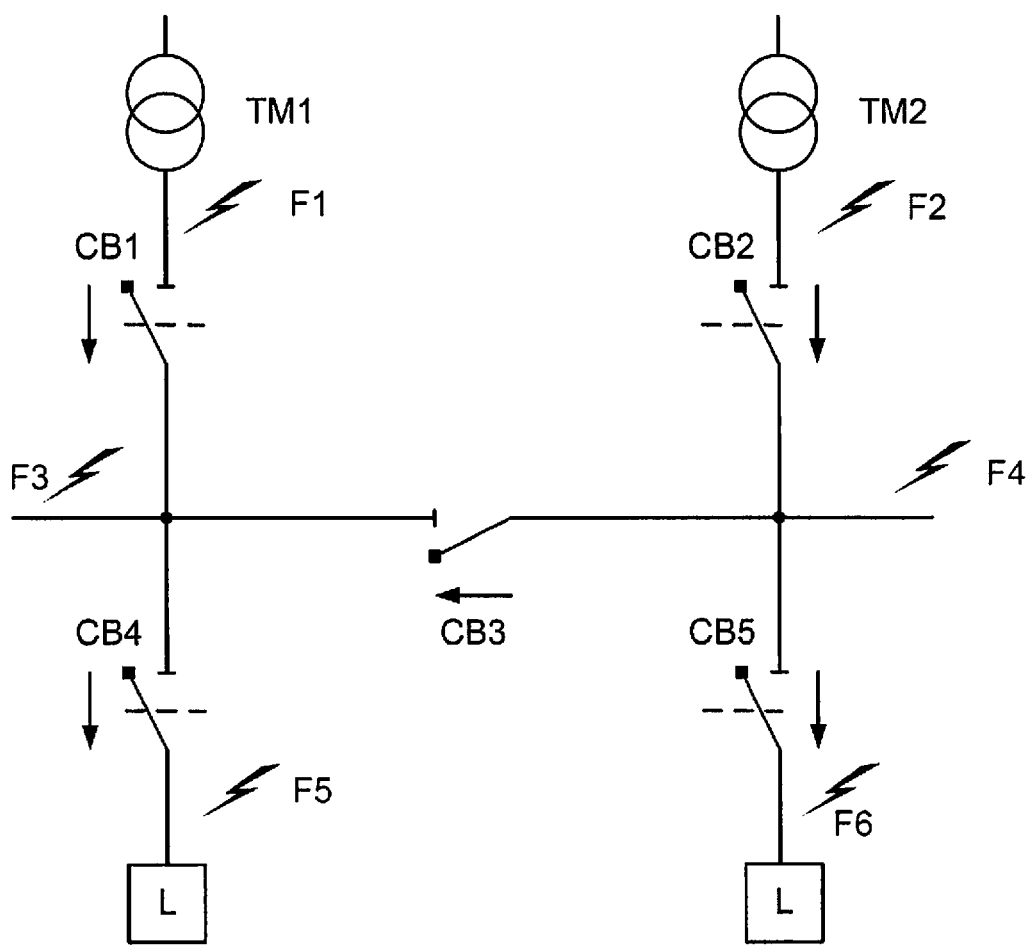
FIG. 1 shows an application scenario for a power distribution network according to an embodiment of the present invention.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks will be stored in a machine or computer readable medium such as a storage medium or non-transitory computer readable medium. A processor(s) will perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments may be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

Note also that the software implemented aspects of the example embodiments may be typically encoded on some form of program storage medium or implemented over some type of transmission medium. The program storage medium (e.g., non-transitory storage medium) may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

According to one embodiment of the present invention, the present invention proposes a protection device for a switch in a power distribution network. The protection device is connected to a protection device of at least one other switch via at least one communication bus, the protection device comprising: a first interface capable of being connected to a first communication bus; a first controlled switch pair connected to the first interface, for configuring the first interface to be an output port or an input port in response to a control signal; a first control unit, for controlling the first controlled switch pair such that the first interface is configured to be an input port within a first diagnosis time period, and for issuing a first alert signal if an input signal from the first interface is abnormal within the diagnosis time period; wherein an interface of each protection device connected to the first communication bus is configured to be an input port within the first diagnosis time period.

This protection device of an embodiment of the present invention can automatically detect whether a communication bus used to transmit ZSI signals is operating normally, and promptly issue an alert upon discovering that a short circuit or reversed polarity fault has occurred on the bus. Thus, this device can implement automatic detection independently, thereby ensuring the reliability of ZSI signal communication.

According to another embodiment of the present invention, the protection device further comprises a first feedback circuit, which is coupled to an output path of the first interface when the first interface is configured to be an output port, for detecting a diagnosis signal sent via the first interface onto the first communication bus and generating a first feedback signal, the first feedback signal being fed into the first control unit; the first control unit also controls the first controlled switch pair such that the first interface is configured to be an output port within a second diagnosis time period, and sends a diagnosis signal periodically onto the first communication bus via the first interface; the first control unit also issues a second alert signal if the first feedback signal is abnormal within the second diagnosis time period; wherein, amongst the interfaces of protection devices connected to the first communication bus, only the first interface is configured to be an output port within the second diagnosis time period.

Preferably, the protection device further comprises a first output circuit connected to an output switch in the first controlled switch pair, and when the output switch is conducting, the first output circuit converts a command from the first control unit to the diagnosis signal and conveys same to the first interface; wherein the first feedback circuit (IN_F, INF_A) is disposed in an output path of the first output circuit (OUTA).

This protection device of an embodiment of the present invention can automatically detect whether an open circuit fault has occurred on a communication bus used to transmit ZSI signals. Thus, this device can automatically detect not only short circuit and reversed polarity faults, but also open circuit faults, thereby further increasing the reliability of ZSI signal communication.

In another embodiment, the protection device further comprises a second interface connected to a second communication bus; a second controlled switch pair connected to the second interface, for configuring the second interface to be an output port or an input port in response to a control signal; the first output circuit is also connected to an output switch in the second controlled switch pair; the first control unit is capable of controlling the first and second controlled switch pairs such that the first interface and the second interface are alternately configured to be output ports within the second diagnosis time period; issuing a diagnosis signal via the output port within the second diagnosis time period; and reading the feedback signal within the second diagnosis time period, and issuing a second alert associated with the corresponding interface if the feedback signal is abnormal.

This protection device of an embodiment of the present invention can alternately detect whether a fault has occurred on the communication buses connected to the two interfaces. Furthermore, the two interfaces can share the same output circuit. Thus the protection device has a smaller volume and lower cost.

Preferably, the protection device proposed by an embodiment of the present invention further comprises: a first input circuit connected to an input switch in the first controlled switch pair, and when the input switch is conducting, the first input circuit converts a signal from the first interface to the input signal that is capable of being read by the first control unit, and conveys same to the first control unit.

Preferably, the first control unit also controls the first controlled switch pair such that the first interface is configured to be an input port within a second diagnosis time period, and issues a second alert if the input signal (IA) is abnormal within the second diagnosis time period; wherein, amongst the interfaces connected to the first communication bus, only one interface is configured to be an output port within the second diagnosis time period.

This protection device of an embodiment of the present invention can configure query units and non-query units in a network differently. In the case of non-query units, the device need only detect whether the input signal is normal periodically, and issue an alert if it is abnormal. Thus the control procedure for non-query units is simple, with a higher response speed.

Preferably, a first input circuit of the protection device can be connected to input switches in the first controlled switch pair and second controlled switch pair, and when the corresponding input switch is conducting, the first input circuit converts a signal from the first/second interface to the input signal that is capable of being read by the first control unit, and conveys same to the first control unit; the first control unit is also used for controlling the first and second controlled switch pairs such that the first interface and the second interface are alternately configured to be input ports within the second diagnosis time period; and issuing a second alert signal associated with the corresponding interface if the input signal is abnormal within the second diagnosis time period.

In this protection device of an embodiment of the present invention, the input circuit can be shared by two interfaces, so the structure is simpler than in the prior art, with no fall in performance.

In addition, when the protection device proposed in an embodiment of the present invention detects that a short circuit fault has occurred on a power supply line, the communication bus fault diagnosis function is automatically interrupted. Once the short circuit fault has been eliminated, the diagnosis function is re-enabled.

According to another aspect of an embodiment of the present invention, an embodiment of the present invention proposes a method for diagnosing faults on a communication bus used to transmit zone selective interlocking signals in a power distribution network, wherein the power distribution network comprises two or more switches, each switch being configured with a protection device, the protection device exchanging ZSI signals with a protection device of at least one other switch via at least one communication bus, the method comprising: configuring interfaces of all protection devices connected to the same communication bus (BUS1, BUS2) to be input ports within a first diagnosis time period; at each protection device connected to the communication bus, detecting an input signal received by an input port thereof; if abnormality is detected in the input signal, the protection device issuing a first alert associated with the corresponding interface.

Preferably, the method further comprises making an embodiment of one of the protection devices connected to the same communication bus a query unit within a second diagnosis time period, and configuring an interface by which the query unit is connected to the communication bus to be an output port, while an interface of another non-query protection device is maintained as an input port; at the query unit, sending a diagnosis signal periodically within the second diagnosis time period; at the query unit, detecting a feedback signal of an output port of the query unit; if the feedback signal is abnormal, the query unit issuing a second alert associated with the corresponding interface.

More preferably, an interface of a non-query unit connected to the same communication bus is configured to be an input port within the second diagnosis time period; at each non-query unit, an input signal of the input port of the non-query unit is detected; if the input signal is abnormal, the non-query unit issues a second alert associated with the corresponding interface.

Preferably, if it is found that the length of time for which a signal is abnormal is greater than a predetermined threshold, a fault alert associated with the corresponding interface is then issued, wherein the predetermined threshold is greater than the first diagnosis time period, or greater than the sum of the first diagnosis time period and the second diagnosis time period. Here, the first diagnosis time period and second diagnosis time period are much smaller than the duration of a ZSI signal.

Preferably, the method may also comprise: if interfaces of all protection devices connected to the communication bus issue the second alert, this indicates that a communication bus open circuit fault has occurred at an interface of the query unit; or if only one or multiple non-query unit(s) issue(s) the second alert, this indicates that a communication bus open circuit fault has occurred at an interface of the non-query unit(s).

Thus, by adopting the method proposed in an embodiment of the present invention, not only can the type of fault on the bus be determined, the position of an open circuit fault can be determined according to the alert situation at each port.

According to another aspect of an embodiment of the present invention, a power distribution system proposed by the present invention comprises two or more circuit breakers connected into a power distribution network; a protection device for implementing zone selective interlocking as described above, configured on each circuit breaker; and at least one communication bus connected between the protection devices, for exchanging signals.

Various embodiments of the present invention are described below with reference to the accompanying drawings. The following description will make the above-mentioned advantages of embodiments of the present invention easier to understand.

FIG. 1 shows by way of example an application scenario for a DZSI system according to an embodiment of the present invention, i.e. a power distribution network structure in the form of an H bridge. As FIG. 1 shows, the H bridge comprises two power supplies TM1 and TM2, which supply power to two passive loads L, respectively. Circuit breakers (CB) CB1, CB2, CB4 and CB5 are provided on each of the bridge arms of the H bridge structure, respectively. A connecting circuit breaker CB3 is also provided, on the middle bridge. The arrow close to each circuit breaker in FIG. 1 indicates a reference current direction of the circuit breaker concerned. The reference current direction is, for example, the direction of current flow through the circuit breaker under normal circumstances (e.g. when the circuit breaker is conducting). Here, the power distribution network structure in the form of an H bridge is merely an example; many different power distribution network structures are possible in actual applications, e.g. annular, etc.

In the H bridge structure application scenario shown in FIG. 1, a short circuit fault could occur at the 6 fault points shown in FIG. 1, i.e. fault points F1-F6. Here, the short circuit fault could be caused by a number of factors, e.g. by shorting of phase lines, or by a grounding fault. According to the principle of ZSI, the direction of transmission of ZSI signals between circuit breakers will be different for the different faults shown in FIG. 1.

Figure 2A:
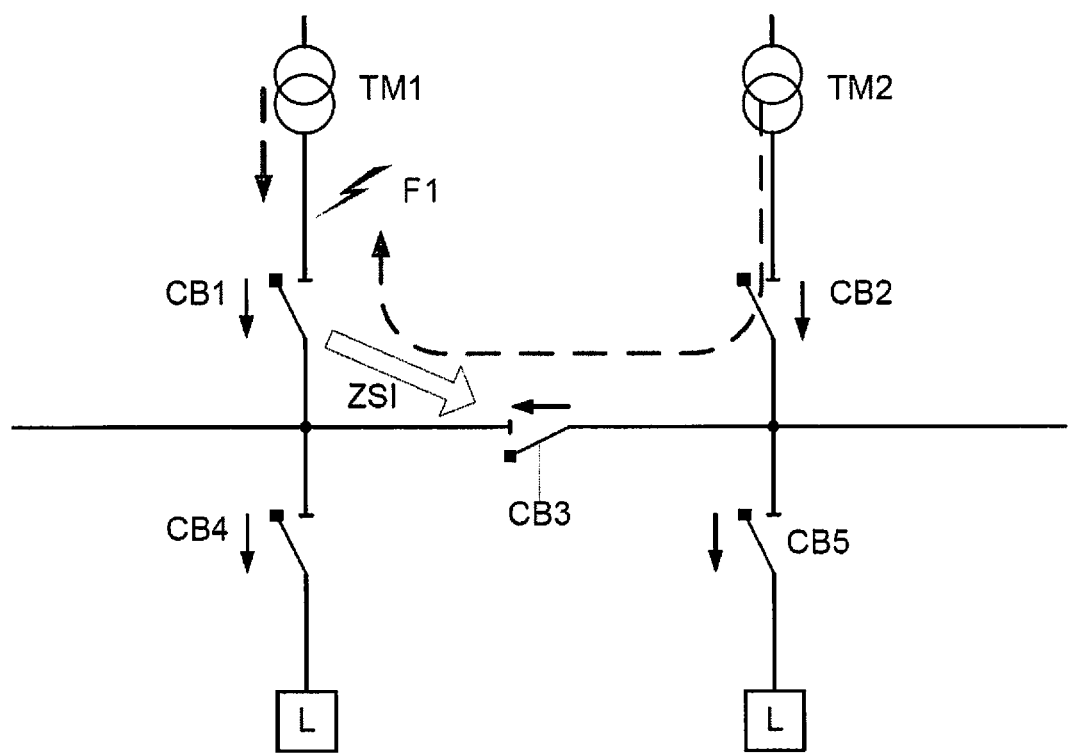
FIG. 2A shows the direction of flow of a fault current when one type of fault occurs in the scenario shown in FIG. 1.
Figure 2B:
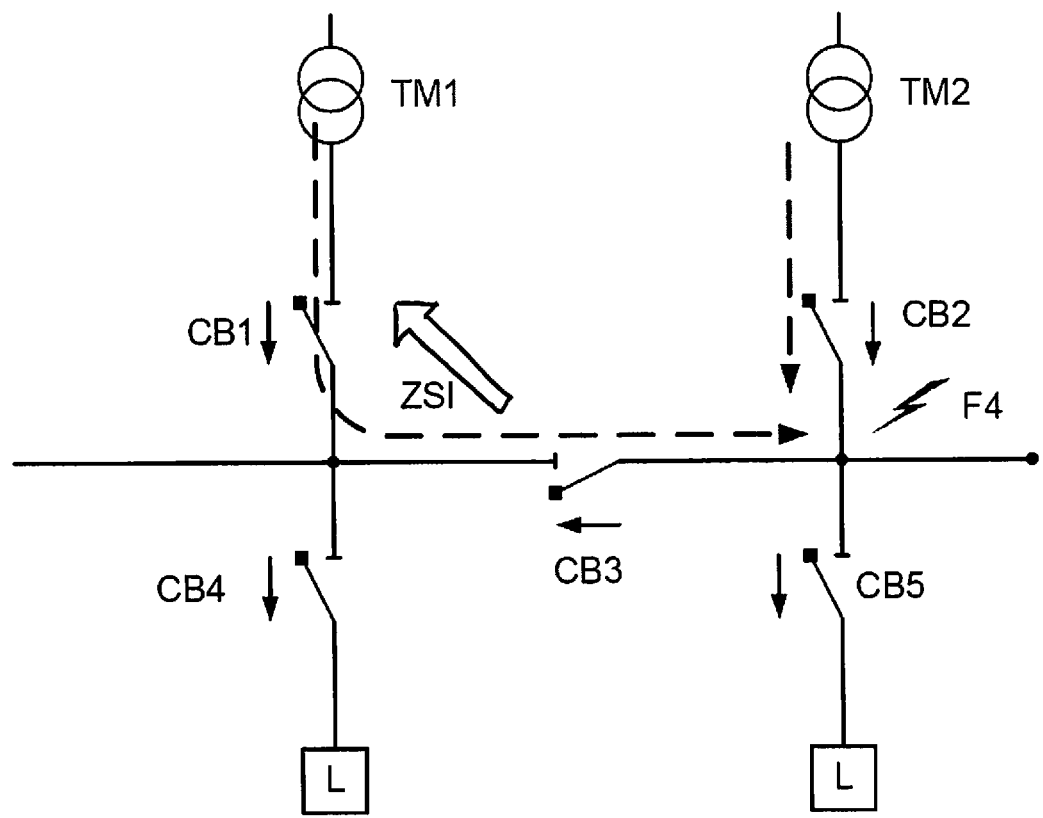
FIG. 2B shows the direction of flow of a fault current when another type of fault occurs in the scenario shown in FIG. 1.

FIGS. 2A and 2B show by way of example the direction of flow of fault current as well as the direction of transmission of ZSI signals between circuit breakers, in two fault situations. In FIG. 2A, if a fault occurs at point F1, fault currents will flow in the direction of the dotted line arrows in FIG. 2A. A ZSI signal must be transmitted from CB1 to CB3 (as shown by the arrow in the figure). Similarly, in FIG. 2B, supposing a fault occurs at point F4, then fault currents will flow in the direction of the dotted line arrows in FIG. 2B. At this point, after detecting the fault, CB3 must transmit an interlocking signal to CB1 (as shown by the arrow in the figure), so that CB1 sets its action delay time, and enters an interlocked state. As can be seen from FIGS. 2A and 2B, the variation in direction of the fault currents between different fault situations is associated with the direction of transmission of ZSI signals between circuit breakers (e.g. CB1 and CB3), and for this reason it is necessary to introduce a directional zone selective interlocking (DZSI) solution.

Figure 3:
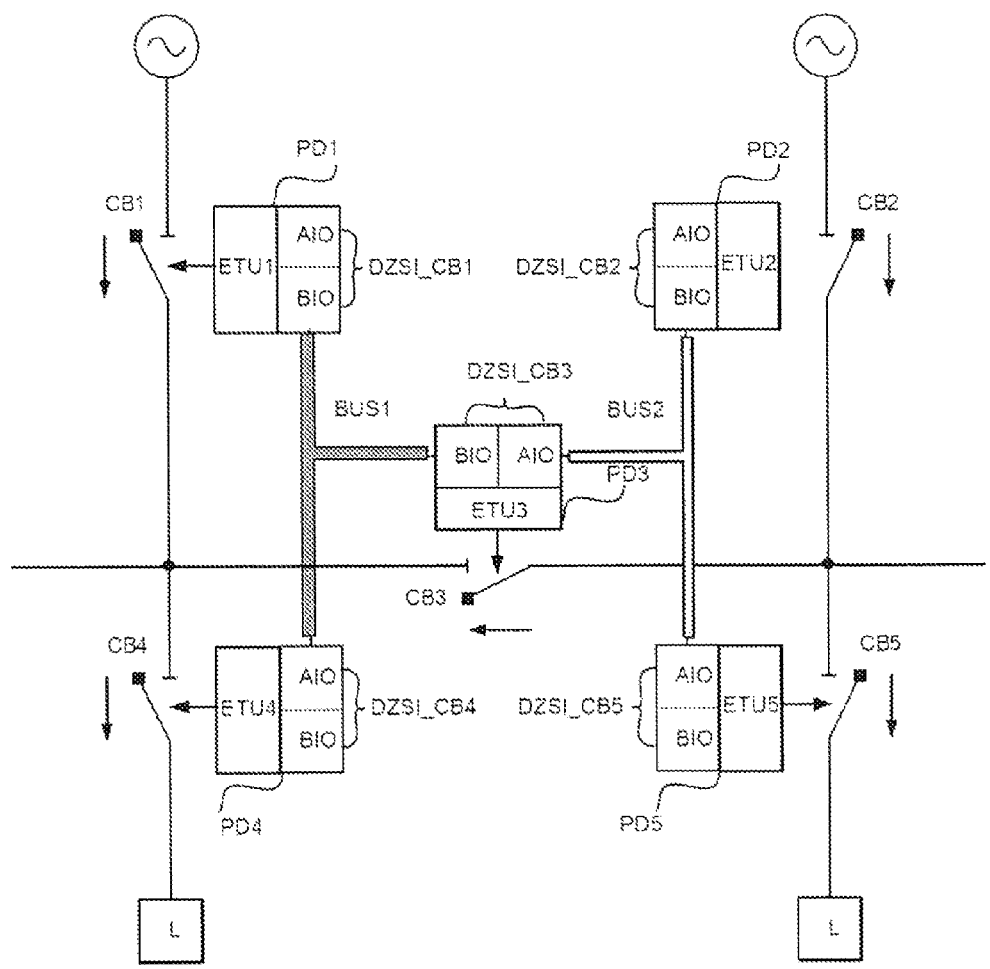
FIG. 3 shows a method of connecting protection devices according to an embodiment of the present invention in the application scenario shown in FIG. 1.

FIG. 3 shows by way of example a solution according to an embodiment of the present invention in the application scenario shown in FIG. 1. As FIG. 3 shows, in an embodiment of the present invention, each circuit breaker CBn is equipped with a protection device (PD) PDn, which specifically comprises an electronic trip unit (ETU) ETUn and a DZSI unit DZSI_CBn connected to the ETUn. Here, n=1, 2, 3, 4 or 5. The ETUn can trip when a fault is discovered, to drive the circuit breaker to open. The DZSI_CBn (e.g. DZSI_CB3) typically comprises two interfaces AIO and BIO; each interface can be configured as an input port or an output port, to be connected to a bus BUS1 or BUS2 used to transmit ZSI signals. The DZSI_CBn can selectively determine from which interface to transmit a ZSI signal, according to the direction of current. Optionally, the DZSI units located on the top and bottom bridge arms in FIG. 3 (e.g. DZSI_CB1) may have just one interface connected to the bus, or have just one interface connected to the bus enabled (e.g. BIO), with the other interface being ineffective.

Figure 4:
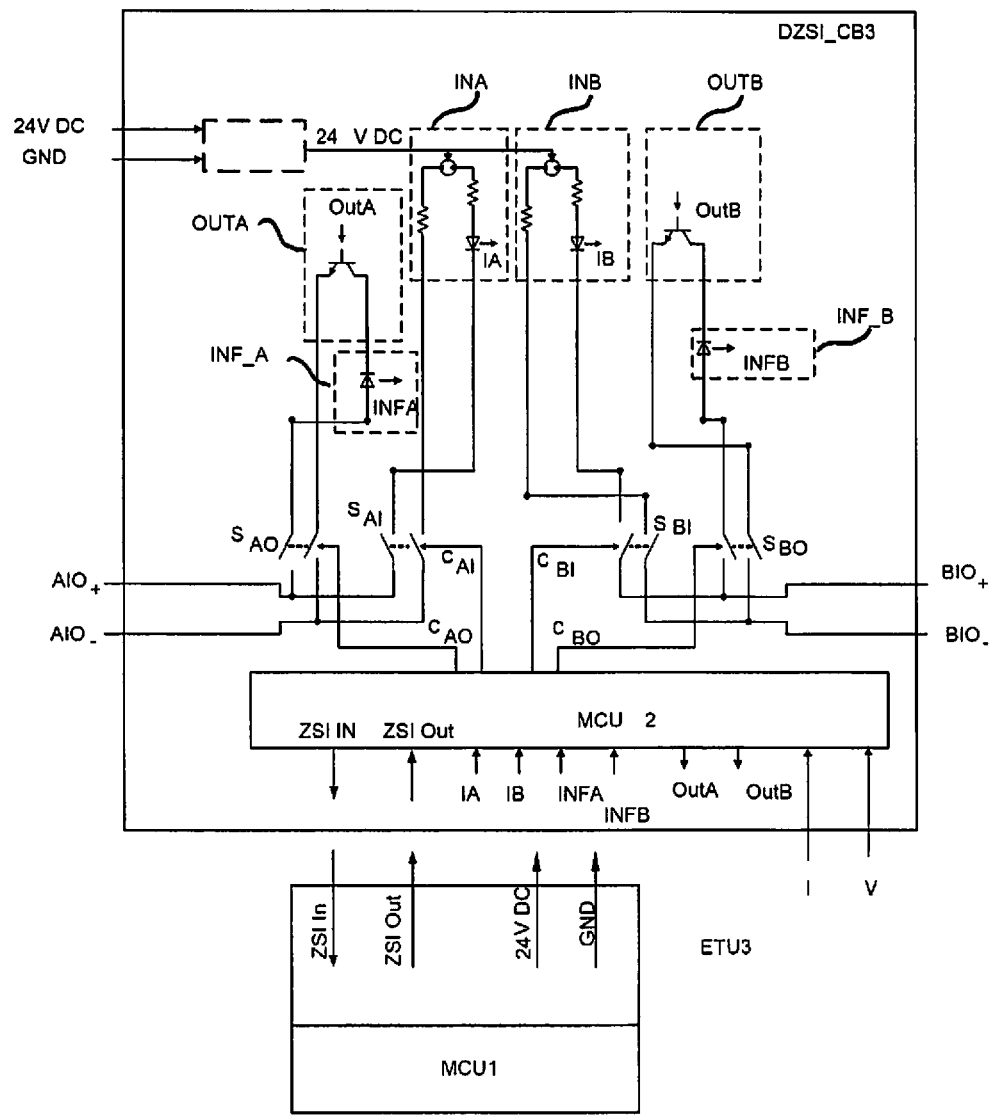
FIG. 4 shows a structural block diagram of a DZSI unit according to an embodiment of the present invention.

FIG. 4 specifically shows a structure of the protection device PD3 connected to the connecting circuit breaker CB3 in FIG. 3 by way of example. In FIG. 4, the closing and opening actions of circuit breaker CB3 are controlled by ETU3. ETU3 may be integrated with CB3, as in existing molded-case circuit breakers (MCCB). In FIG. 4, for the sake of simplicity, only a control unit MCU1 and associated interfaces ZSI In and ZSI Out are shown in ETU3. The two interfaces ZSI In and ZSI Out can be connected to corresponding interfaces ZSI IN and ZSI OUT of DZSI CB3, to exchange ZSI signals. Specifically, upon discovering a fault, ETU3 sends a ZSI signal to DZSI_CB3; DZSI_CB3 then transmits the ZSI signal to the appropriate bus, according to the direction of current. If DZSI_CB3 receives a ZSI signal from the relevant bus, it transmits this ZSI signal to ETU3.

As FIG. 4 shows, DZSI_CB3 specifically comprises a control unit MCU2, two interfaces AIO and BIO, as well as input circuits INA and INB and output circuits OUTA and OUTB for the two ports. Feedback circuits INF_A and INF_B are also provided in output paths of the output circuits. The input circuits convert signals received from the interfaces AIO/BIO to IA/IB signals capable of being read by MCU2. The output circuits convert output commands OutA/OutB from MCU2 to signals which can be sent onto the buses from interfaces AIO/BIO. A controlled switch (e.g. SAO, SAI, SBO and SBI) is provided between each interface and its respective input or output circuit. By controlling these switches, MCU2 selectively determines whether AIO or BIO is to serve as an input port or an output port. For example, MCU2 closes SAI and opens SAO, thereby configuring AIO to be connected to the input circuit INA thereof, so that interface AIO is configured as an input port AI. Conversely, if AIO is connected to the output circuit OUTA thereof, then interface AIO is configured as an output port AO. Feedback circuits INF_A and INF_B can convert signals sent onto the buses by output circuits OUTA and OUTB to INFA/INFB capable of being read by MCU2, to serve as feedback for MCU2.

Figure 5:
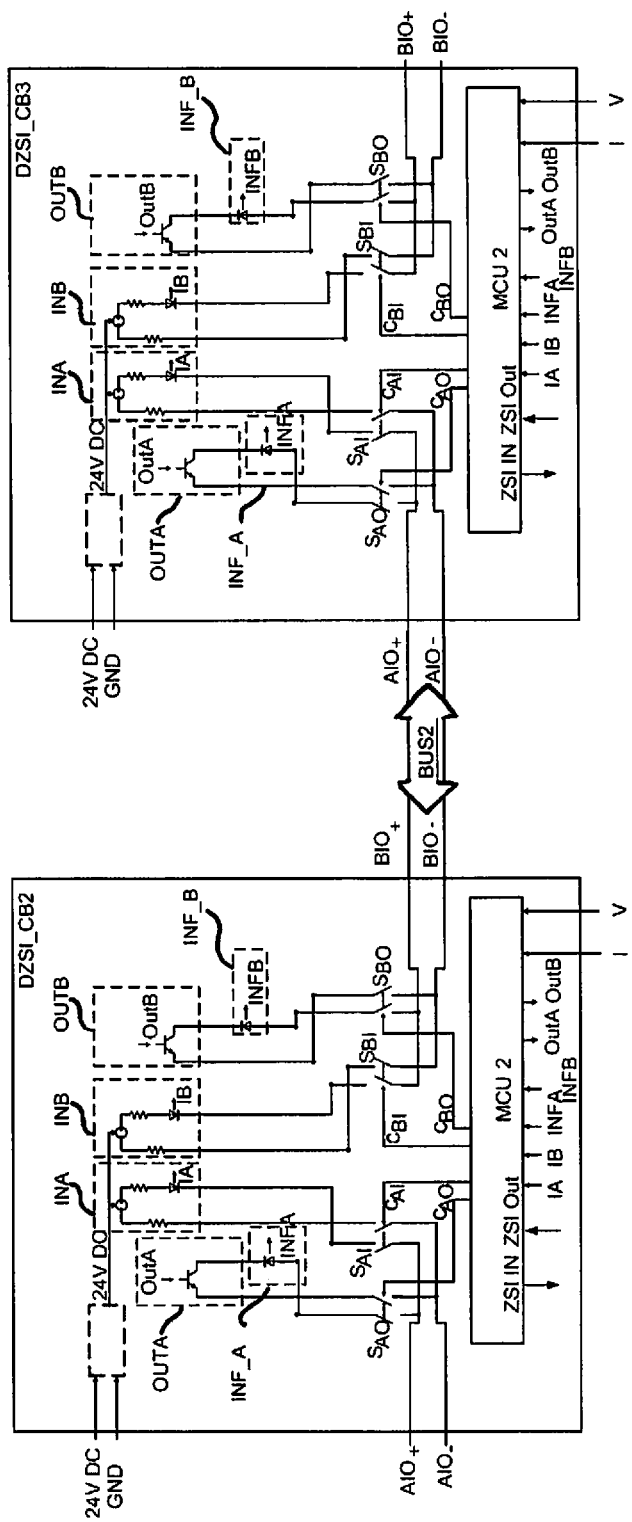
FIG. 5 shows a structural block diagram of two DZSI units connected together by a communication bus according to an embodiment of the present invention.

FIG. 5 shows by way of example a scenario in which two DZSI units are connected together by a communication bus. As FIG. 5 shows, interface BIO of DZSI_CB2 is connected to AIO of DZSI_CB3 by communication bus BUS2. In this case, if AIO of DZSI_CB3 serves as an output port (SAO=ON, SAI=OFF), while BIO of DZSI_CB2 (SBI=ON, SBO=OFF) serves as an input port, then if OutA in DZSI_CB3 is a valid value, output circuit OUTA in DZSI_CB3 and input circuit INB in DZSI_CB2 will form a current loop via communication bus BUS2. At this point, if BUS2 is normal, DZSI_CB2 can receive a valid IB signal. At the same time, in DZSI CB3, feedback circuit INF_A in the current loop can also sense the current flowing in the loop, and send it as a feedback signal INFA to MCU2. Thus, it is possible to determine whether the communication bus is connected normally by detecting an input signal IA and a feedback signal in the DZSI units at the two ends of communication bus BUS2.

In the examples shown in FIGS. 4 and 5, the input circuit INA/INB is a series-connected branch connected to the two ends of the relevant interface; the series-connected branch comprises a power supply (24 V power supply), a current-limiting resistor and a current sensitive element, which are connected in series. Preferably, the current sensitive element is an optocoupler. The optocoupler is represented in the figures by a simplified light-emitting diode (LED). The output circuit OUTA/OUTB is for example a bipolar junction transistor connected to the two ends of the interface in thereof, with the base thereof being the controlled electrode, which is controlled by a command OutA/OutB from the MCU2. The feedback circuit INF_A/INF_B is preferably an optocoupler disposed in an output path (e.g. on the collector side of the output bipolar junction transistor). Here, the optocoupler in the circuit serves an isolating function, to avoid damage to the MCU2, and may be replaced with another isolating element.

Figure 6:
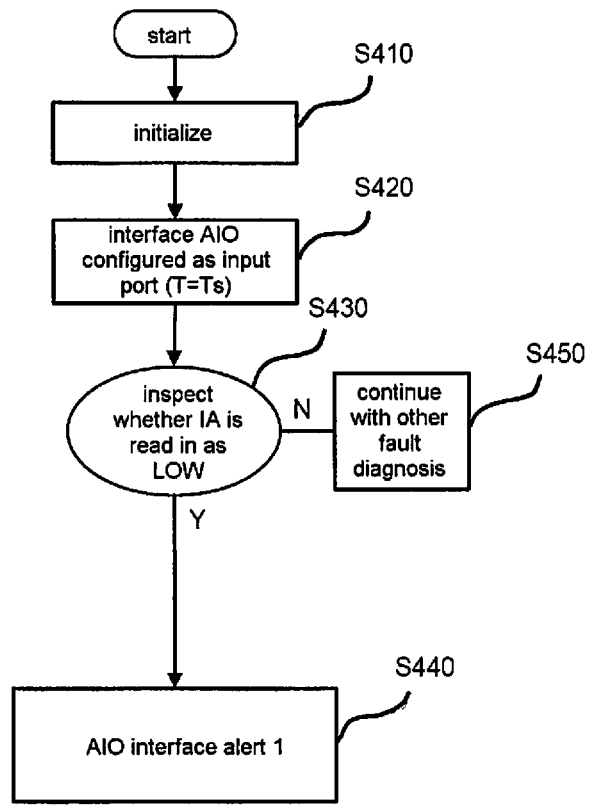
FIG. 6 shows a flow chart of a diagnosis method for a short circuit or reversed polarity fault according to another embodiment of the present invention.

Generally, a communication bus used to transmit ZSI signals is susceptible to three kinds of fault, namely short circuit, open circuit and bus connection with reversed polarity. A bus fault diagnosis method according to an embodiment of the present invention is described in detail below, taking BUS2 in FIG. 3 as an example. As FIG. 3 shows, three DZSI units (DZSI_CB2/3/5) are connected to BUS2. First of all, any one of the three DZSI units is chosen or determined to serve as a query DZSI unit, or query unit for short, in the fault diagnosis. In the example of FIG. 3, DZSI_CB3 preferably serves as the query unit, while the other two DZSI units are non-query units. During the diagnosis process, only the query unit sets an interface thereof to be an output port, and can send diagnosis signals on the bus BUS2 periodically. The interfaces of the non-query units are only configured to be input interfaces throughout the diagnosis process. Flow charts for diagnosing, in the query unit and the non-query units, whether BUS2 has developed a fault are shown in FIG. 6 and FIG. 7. Here, with regard to the query unit and non-query units, if the ETU detects a short circuit fault, then the diagnosis process is interrupted, and the protection device PD deals with the fault according to convention and transmits a ZSI signal. If the short circuit fault disappears, the bus diagnosis process begins again, being executed in a periodical manner, and is interrupted again if a ZSI signal appears again.

FIG. 6 shows a flow chart for diagnosing a connection with reversed polarity or a short circuit fault in a bus. Interface AIO in DZSI_CB3 is connected to BUS2, so only the diagnosis process for one AIO interface will be considered first. As FIG. 6 shows, in step S410, initialization of MCU2 in DZSI_CB3 as the query unit for example is completed. Next, in step S420, MCU2 opens switch $S_{AO}$ ($S_{AO}$=OFF) and closes $S_{AI}$ ($S_{AI}$=ON) by sending commands ($C_{AI}/C_{AO}$), thereby connecting interface AIO of DZSI_CB3 to input circuit INA, i.e. configuring AIO to be an input port AI and maintaining this state for a predetermined diagnosis time T=Ts. For the duration of the diagnosis time Ts, the interfaces of the two non-query DZSI units connected to BUS2 are also configured to be input ports. Referring to FIG. 5, when two interfaces connected to the same bus are both configured to be input ports, this is equivalent to the input circuits of two DZSI units being connected in opposition to each other, so that a current loop cannot be formed under normal circumstances. Conversely, if for example a reversed polarity fault occurs at interface BIO of DZSI_CB2, or a short circuit occurs on BUS2, then a current loop can be formed between the two input circuits in FIG. 5. Thus, in step S430, MCU2 in DZSI_CB3 reads an input signal IA of input circuit INA, and determines whether signal IA is a valid LOW. As stated above, if signal IA is not LOW, this indicates that no current loop is formed, so step S450 can be performed to carry out other fault diagnosis. Conversely, if signal IA is LOW, this indicates that a reversed polarity or short circuit fault has occurred on BUS2, and the procedure moves on to step S440. In step S440, MCU2 issues a reversed polarity or short circuit alert, i.e. alert 1; this indicates that alert 1 has occurred at interface AIO of DZSI_CB3.

The procedure shown in FIG. 6 can similarly be performed in a non-query DZSI unit. For example, DZSI_CB5 as a non-query unit can perform reversed polarity or short circuit fault diagnosis according to the procedure shown in FIG. 6, and issue an alert 1 upon discovering a reversed polarity or short circuit fault, to indicate that a reversed polarity or short circuit fault has been detected at the AIO port thereof. By the same principle, DZSI_CB2 may perform the same operation on the BIO port thereof. It must be noted that within the diagnosis period Ts, all of the ports connected to the same bus BUS2 must be configured to be input ports.

Figure 7A:
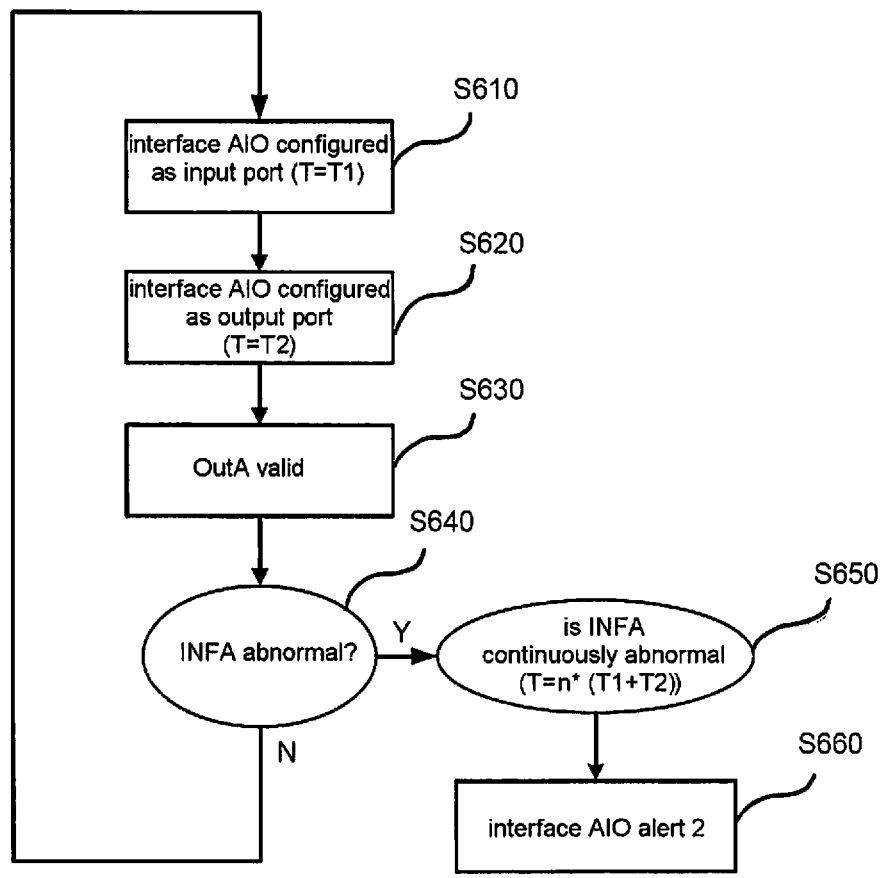
FIGS. 7A and 7B show flow charts of diagnosis methods executed by a query DZSI unit and non-query DZSI unit according to another embodiment of the present invention.
Figure 7B:
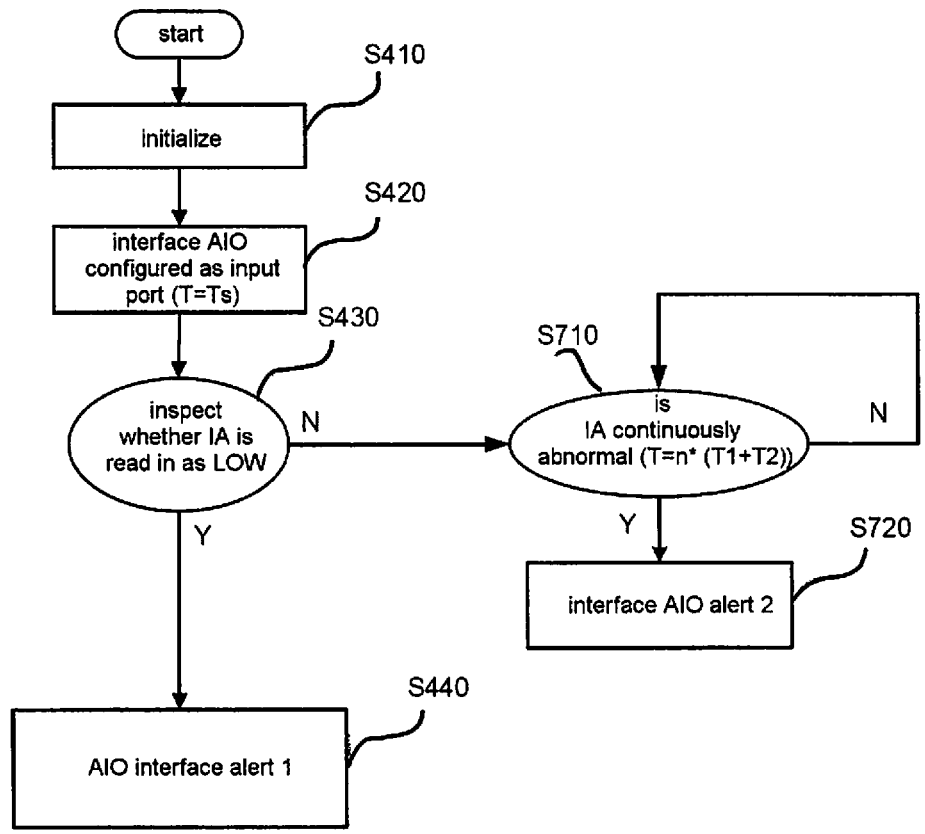

FIGS. 7A and 7B show by way of example flow charts for detecting open circuit faults. The fault diagnosis process shown in FIG. 7A may be completed in step S450 of FIG. 6. In step 610, (MCU2 in) DZSI_CB3 serving as a query unit configures interface AIO to be an input port and maintains this state for a time T=T1. In step S620, said MCU2 configures interface AIO to be an output port ($S_{AO}$=ON, $S_{AI}$=OFF) and maintains this state for a time T=T2. Since the interfaces of the non-query units connected to the same BUS2 are configured to be input ports all along, only the interface of the query unit that is connected to BUS2 is configured to be an output port during time T2. Thus, in step S630, within the time period T2, (MCU2 in) DZSI_CB3 sends out a command OutA to enable output circuit OUTA to send a diagnosis signal (a non-ZSI signal) onto BUS2. In step S640, MCU2 reads a feedback signal INFA from feedback circuit INF_A periodically, and determines whether INFA is abnormal. Referring to FIG. 5, when BUS2 is normal, output circuit OUTA of DZSI_CB3 and an input circuit of another non-query DZSI unit (e.g. DZSI_CB2) can form a current loop, and INFA is at a normal LOW level. However, when an open circuit occurs on BUS2, INFA is at an abnormal HIGH level. Thus, in step S650, to avoid erroneous reporting, if the abnormality of INFA persists for T=n*(T1+T2), this indicates that an open circuit has occurred on BUS2, and the procedure goes on to step S660. Otherwise, the procedure returns to step S610 to form a cycle. In step S660, MCU2 in DZSI_CB3 issues an alert 2 for interface AIO thereof, i.e. an open circuit fault.

FIG. 7B shows a flow chart for fault diagnosis performed by a non-query DZSI unit. To make the procedure complete, the left half of FIG. 7B includes the same procedure for reversed polarity and short circuit fault diagnosis as in FIG. 6, which is not repeated here. As the procedure in the right half of FIG. 7B shows, within time periods T1 and T2, the interfaces connected to BUS2 (e.g. interface BIO of DZSI_CB2) are configured to be input ports all along, and an input signal IB is read in periodically in step S710. If, in step S720, it is determined that input signal IB remains HIGH or LOW for T=n*(T1+T2), the procedure continues to step S720. In step S720, an open circuit alert 2 for the corresponding interface is issued. The procedure shown in FIG. 7B may similarly be carried out for interface AIO of DZSI_CB5.

As FIG. 3 shows, the two interfaces AIO and BIO of DZSI_CB3 connected to the connecting circuit breaker CB3 may be connected to two communication buses, BUS1 and BUS2, respectively. Thus, when DZSI_CB3 serves as query unit, it can diagnose whether the two buses BUS1 and BUS2 are normal. For example, when determining an open circuit fault, DZSI_CB3 can simultaneously or alternately control the two interfaces thereof, AIO and BIO, to implement the procedure shown in FIG. 7A.

In addition, the procedures shown in FIGS. 7A and 7B may be performed after program power-on, and when no fault has occurred. Once a fault has been detected, and it is necessary to transmit a ZSI signal on a bus, the DZSI unit automatically enters a normal ZSI signal processing procedure, and interrupts the fault diagnosis procedure.

FIGS. 8A-E show signal waveforms at the interfaces of the DZSI_CBn connected to BUS2 when BUS2 is in different operating states. FIG. 8A shows the situation when BUS2 is operating normally. Normally, DZSI_CB3 as query unit outputs a diagnosis signal periodically from AO, and correspondingly, INFA receives a valid feedback signal periodically. Correspondingly, under normal conditions, interface BI of DZSI_CB2 and interface AI of DZSI_CB5 also receive a valid signal. FIG. 8B shows the waveform in the case where BUS2 has a short circuit fault. With a short circuit on BUS2, feedback signal INFA, BI of CB2 and AI of CB5 are all continuously LOW, i.e. abnormal. FIGS. 8C-E show three different open circuit situations. As FIG. 8C shows, when an open circuit occurs near CB3, INFA, BI of CB2 and AI of CB5 are all continuously HIGH, i.e. a valid signal cannot be received. When an open circuit occurs near CB2, only BI of CB2 becomes abnormal; the other interfaces operate normally. Similarly, when an open circuit occurs near CB5, only AI of CB5 becomes abnormal; the other interfaces operate normally. Thus, it is possible to determine what type of fault has occurred based on the fault situation at each interface. For example, if interfaces of all the protection devices connected to the communication bus issue the open circuit alert, this indicates that a communication bus open circuit fault has occurred at an interface of the query unit; or if just one or multiple non-query protection device(s) issue(s) the open circuit alert, this indicates that a communication bus open circuit fault has occurred at an interface of the non-query protection device(s).

Figure 9:
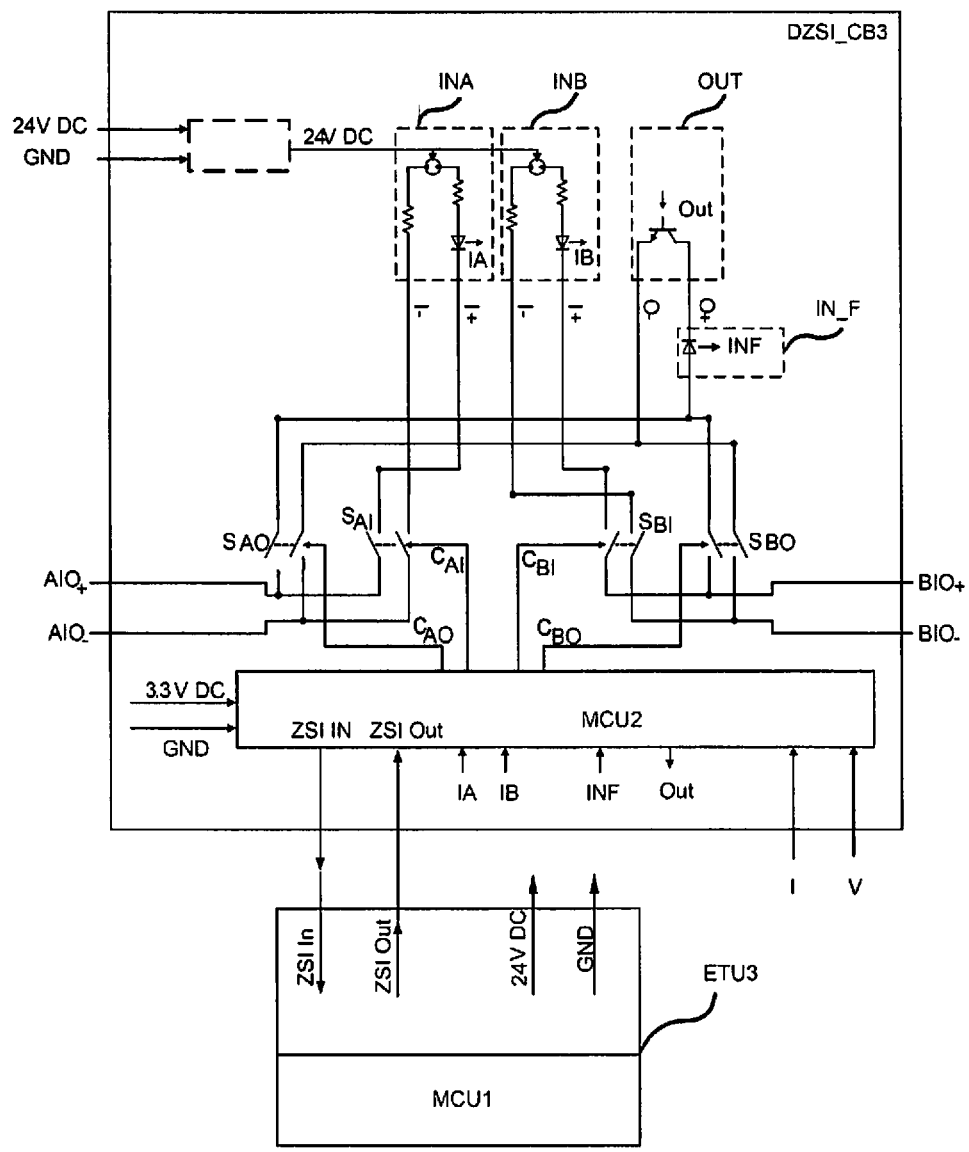
FIG. 9 shows a structural block diagram of a DZSI unit according to another embodiment of the present invention.

FIG. 9 specifically shows another structure of protection device PD3 connected to the connecting circuit breaker CB3 in FIG. 3 by way of example. In FIG. 9, components that are the same as those in FIG. 4 are represented by the same labels, and have similar functions to those in FIG. 4, so are not described again here. Unlike in FIG. 4, AIO and BIO share the same output circuit OUT; a feedback circuit IN_F is also provided on an output path of the output circuit, with a feedback signal INF thereof being read by MCU2.

Figure 10:
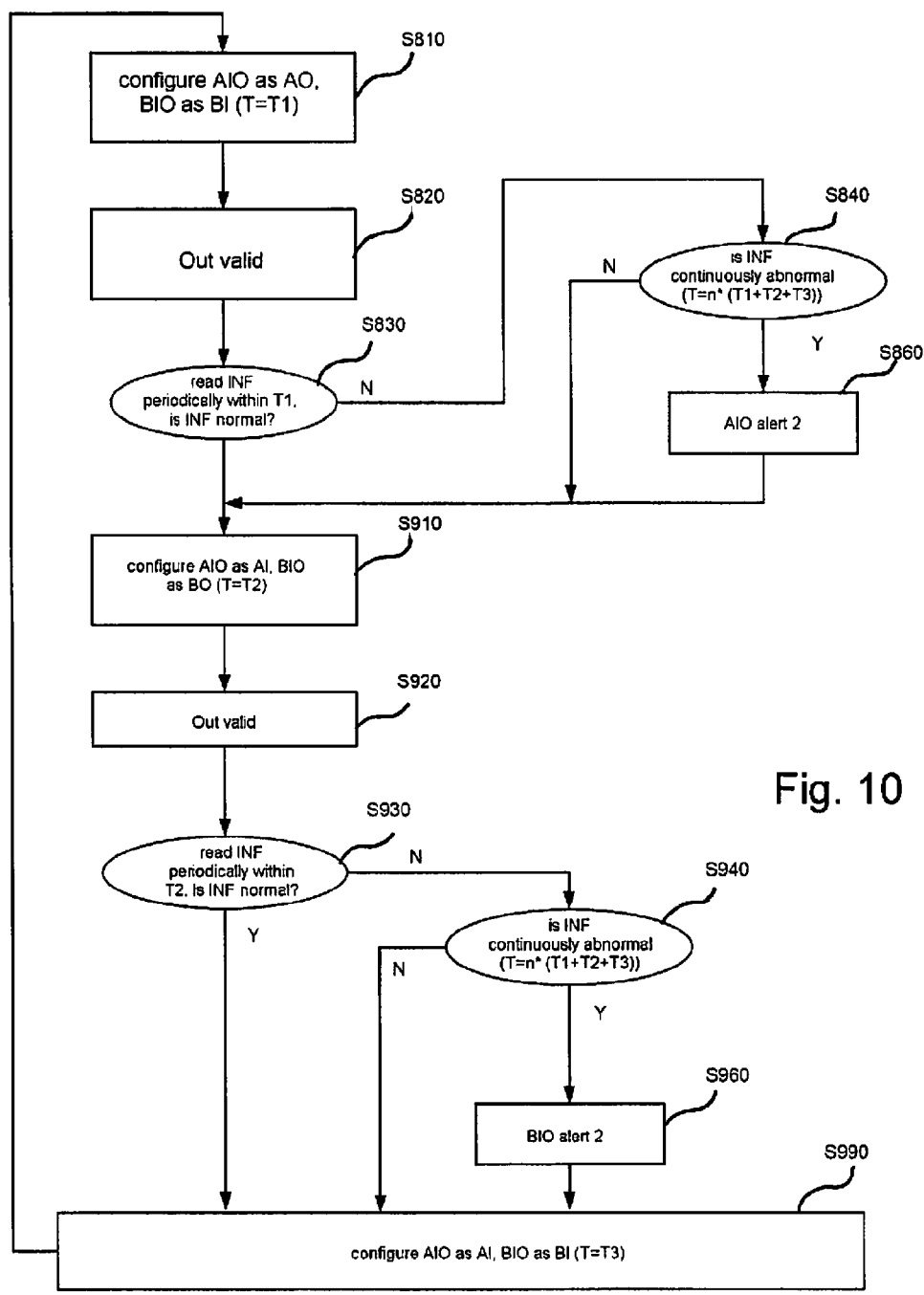
FIG. 10 shows a flow chart of a diagnosis method executed by a query DZSI unit according to another embodiment of the present invention.

Correspondingly, when just one interface AIO/BIO is enabled in the circuit structure shown in FIG. 9, the bus fault diagnosis method is substantially the same as in FIGS. 6 and 7. When DZSI_CB3 serves as a query unit to diagnose whether a fault has occurred on two buses (BUS1 and BUS2), the fact that the output circuit OUT in DZSI_CB3 is shared by AIO and BIO means that it is necessary to configure AIO/BIO alternately to be an output port to perform bus fault diagnosis. The specific flow chart for the method is shown in FIG. 10. Optionally, the procedure shown in FIG. 10 may also be executed as, for example, step S450 in FIG. 6.

As FIG. 10 shows, in step S810, MCU2 in DZSI_CB3 configures interface AIO thereof to be an output port and BIO to be an input port for a time T=T1. The specific method of configuring AIO/BIO is the same as that described above. In step S820, MCU2 issues a valid Out command in order to send out a diagnosis signal to bus BUS2. In step S830, within the time period T=T1, MCU2 reads in a feedback signal INF acquired by the feedback circuit, and determines whether the INF thus read in is abnormal. If INF is normal, then step S910 is performed. If INF is abnormal, then step S840 is performed, to determine whether the time for which INF remains abnormal exceeds a predetermined time. If INF remains abnormal for the predetermined time (e.g. is continuously LOW or continuously HIGH), then in step S860 MCU2 issues an alert 2 indicating that an open circuit fault has occurred at port AIO, followed by step S910.

In FIG. 10, if signal INF is normal, then diagnosis of another interface begins. In step S910, MCU2 in DZSI_CB3 configures interface BIO thereof to be an output port and AIO to be an input port for a time T=T2. The specific method of configuring AIO/BIO is the same as that described above. In step S920, MCU2 issues a valid Out command in order to send out a diagnosis signal to bus BUS1. In step S930, within the time period T=T2, MCU2 reads in a feedback signal INF acquired by the feedback circuit, and determines whether the INF thus read in is abnormal. If it is normal, then step S990 is performed. If INF is abnormal, then step S940 is performed, to determine whether the time for which INF remains abnormal exceeds a predetermined time. If INF remains abnormal for the predetermined time (e.g. is continuously LOW or continuously HIGH), then in step S960 MCU2 issues an alert 2 indicating that an open circuit fault has occurred at port BIO. If signal INF is normal, then step S990 is performed. In step S990, AIO and BIO are both set to be input ports, and after maintaining this state for a time T=T3, the procedure returns to step S910 to form a cycle. In FIG. 10, the predetermined time for which INF remains abnormal is for example T=n*(T1+T2+T3).

Similarly, interfaces AIO and BIO may also share the same input circuit. Similarly to FIG. 10, for fault diagnosis, MCU2 needs to configure AIO and BIO to be an input port alternately, and alternately read in input signals and determine whether they are abnormal. Optionally, the DZSI unit and ETU may share the same input and output circuits, with the ETU assuming the task of sending the diagnosis signal via the interface between MCU1 and MCU2. The principles and implementation thereof are similar to what has already been described, so are not described in detail again here.

Figure 11:
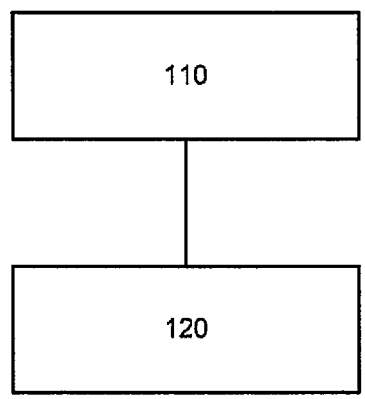
FIG. 11 shows a structural block diagram of a control unit according to another embodiment of the present invention.

The MCU2 in FIGS. 4 and 9 may also be specifically understood as including two subunits, namely a fault diagnosis configuration unit and an alert unit. FIG. 11 shows a structural diagram of an MCU2 by way of example. As FIG. 11 shows, the fault diagnosis configuration unit 110 is for configuring each interface in the DZSI unit as shown in FIGS. 6, 7 and 10, and for sending diagnosis signals. The alert unit 120 is for reading input signals or feedback signals, determining whether these signals show abnormal operation, and issuing an appropriate alert in the case of abnormality, as shown in FIGS. 6, 7 and 10.

Those skilled in the art can understand that the structure proposed in an embodiment of the present invention may be applied not only in the H bridge structure shown in FIG. 3 and an annular network structure, but also in structures with other network topologies.

Those skilled in the art should understand that a variety of changes and amendments could be made to the embodiments disclosed above without departing from the substance of the present invention. Such changes and amendments shall fall within the scope of protection of the present invention. Thus, the scope of protection of the present invention shall be defined by the attached claims.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A protection device for a switch in a power distribution network, wherein the protection device is connected to a protection device of at least one other switch via at least one communication bus, the protection device comprising:
   a first interface, connectable to a first communication bus;
   a first controlled switch pair connected to the first interface, for configuring the first interface to be an output port or an input port in response to a control signal; and
   a first control unit, configured to control the first controlled switch pair such that the first interface is configured to be an input port within a first diagnosis time period; and configured to issue a first alert signal if an input signal from the first interface is abnormal within the diagnosis time period;
   wherein an interface of each protection device connected to the first communication bus is configured to be an input port within the first diagnosis time period.

2. The protection device of claim 1, further comprising:
   a first feedback circuit, coupled to an output path of the first interface when the first interface is configured to be an output port, to detect a diagnosis signal sent via the first interface onto the first communication bus and to generate a first feedback signal, the first feedback signal being feedable into the first control unit; and wherein
   the first control unit is also configured to control the first controlled switch pair such that the first interface is configured to be an output port within a second diagnosis time period, and is configured to send a diagnosis signal periodically onto the first communication bus via the first interface, wherein
   the first control unit is also configured to also issue a second alert signal if the first feedback signal is abnormal within the second diagnosis time period, and wherein
   amongst the interfaces of protection devices connected to the first communication bus, only the first interface is configured to be an output port within the second diagnosis time period.

3. The protection device of claim 2, further comprising:
   a first output circuit, connected to an output switch in the first controlled switch pair, wherein, when the output switch is conducting, the first output circuit converts a command from the first control unit to the diagnosis signal and conveys same to the first interface and
   wherein the first feedback circuit is disposed in an output path of the first output circuit.

4. The protection device of claim 3, further comprising:
   a second interface, connected to a second communication bus;

a second controlled switch pair, connected to the second interface, to configure the second interface to be an output port or an input port in response to a control signal, wherein the first output circuit is also connected to an output switch in the second controlled switch pair, the first and second controlled switch pairs are controllable by the first control unit such that the first interface and the second interface are configured to be output ports alternately within the second diagnosis time period; issuing a diagnosis signal via the output port within the second diagnosis time period; and reading the feedback signal within the second diagnosis time period, and issuing a second alert associated with the corresponding interface if the feedback signal is abnormal.

5. The protection device of claim 1, further comprising:
a first input circuit, connected to an input switch in the first controlled switch pair, wherein when the input switch is conducting, the first input circuit converts a signal from the first interface to the input signal that is readable by the first control unit, and conveys same to the first control unit.

6. The protection device of claim 5, wherein the first control unit is also configured to control the first controlled switch pair such that the first interface is configured to be an input port within a second diagnosis time period, and is configured to issue a second alert if the input signal is abnormal within the second diagnosis time period; and wherein amongst the interfaces connected to the first communication bus, only one interface is configured to be an output port within the second diagnosis time period.

7. The protection device of claim 4, further comprising:
a first input circuit, connected to input switches in the first controlled switch pair and second controlled switch pair, wherein, when the corresponding input switch is conducting, the first input circuit converts a signal from at least one of the first and second interface to the input signal that is readable by the first control unit, and conveys same to the first control unit wherein the first control unit is also used for controlling the first and second controlled switch pairs such that the first interface and the second interface are configured to be input ports alternately within the second diagnosis time period, and issuing a second alert signal associated with the corresponding interface if the input signal is abnormal within the second diagnosis time period.

8. The protection device of claim 1, wherein
the first input circuit comprises a power supply and a first current sensitive element connected in series with the power supply, wherein the first current sensitive element senses the input signal when a current flows therethrough; or
the first output circuit comprises a controlled bipolar junction transistor, a controlled end of the controlled bipolar junction transistor being connected to the first control unit, and an output switch being coupled to the collector of the controlled bipolar junction transistor; or
the output feedback circuit is a second current sensitive element coupled to the collector of the controlled bipolar junction transistor, the second current sensitive element being configured to sense the feedback signal when a current flows therethrough.

9. The protection device of claim 8, wherein the current sensitive element is an optocoupler.

10. The protection device of claim 1, wherein the first control unit is also configured to control the first controlled switch pair in order to switch the first interface from an output port to an input port, or vice versa, when the direction of current flowing through the switch is reversed, to send or receive an interlocking signal.

11. A method for diagnosing faults on a communication bus used to transmit zone selective interlocking signals in a power distribution network, the power distribution network including two or more switches, each of the two or more switches being configured with a protection device, the protection device being configured to exchange signals with a protection device of at least one other of the two or more switches via at least one communication bus, the method comprising:

configuring interfaces of all of the protection devices connected to the same communication bus to be input ports within a first diagnosis time period;

detecting, at each of the protection devices connected to the communication bus, an input signal received by an input port thereof; and issuing via the protection device, if abnormality is detected in the input signal, a first alert associated with the corresponding interface.

12. The method of claim 11, further comprising:
making one of the protection devices connected to the same communication bus a query unit within a second diagnosis time period, and configuring an interface by which the query unit is connected to the communication bus to be an output port, while an interface of another non-query protection device is maintained as an input port;

sending, at the query unit, a diagnosis signal periodically within the second diagnosis time period;

detecting, at the query unit, a feedback signal of an output port of the query unit; and issuing via the query unit, if the feedback signal is abnormal, a second alert associated with the corresponding interface.

13. The method of claim 12, further comprising:
configuring an interface, of a non-query unit connected to the same communication bus, to be an input port within the second diagnosis time period;

detecting, at each non-query unit, an input signal of the input port of the non-query unit;

issuing via the non-query unit, if the input signal is abnormal, a second alert associated with the corresponding interface.

14. The method of claim 11, wherein
if it is found that the length of time for which a signal is abnormal is greater than a threshold, issuing a fault alert associated with the corresponding interface, wherein the threshold is greater than the first diagnosis time period, or greater than the sum of the first diagnosis time period and the second diagnosis time period.

15. The method of claim 11, wherein the first diagnosis time period and second diagnosis time period are much smaller than the duration of the signal.

16. The method of claim 13, wherein
if interfaces of all protection devices connected to the communication bus issue the second alert, this indicates that a communication bus open circuit fault has occurred at an interface of the query unit; or
if only one or multiple non-query units issues the second alert, this indicates that a communication bus open circuit fault has occurred at an interface of the non-query units.

17. A power distribution system, comprising:
two or more circuit breakers connected into a power distribution network;
the protection device of claim 1, configured on each of the two or more circuit breakers; and
at least one communication bus connected between the protection devices, configured to exchange signals.

18. The protection device of claim 2, wherein
the first input circuit comprises a power supply and a first current sensitive element connected in series with the power supply, wherein the first current sensitive element senses the input signal when a current flows therethrough; or
the first output circuit comprises a controlled bipolar junction transistor, a controlled end of the controlled bipolar junction transistor being connected to the first control unit, and an output switch being coupled to the collector of the controlled bipolar junction transistor; or
the output feedback circuit is a second current sensitive element coupled to the collector of the controlled bipolar junction transistor, the second current sensitive element being configured to sense the feedback signal when a current flows therethrough.

19. The protection device of claim 18, wherein the current sensitive element is an optocoupler.

20. The protection device of claim 19, wherein
the first input circuit comprises a power supply and a first current sensitive element connected in series with the power supply, wherein the first current sensitive element senses the input signal when a current flows therethrough; or
the first output circuit comprises a controlled bipolar junction transistor, a controlled end of the controlled bipolar junction transistor being connected to the first control unit, and an output switch being coupled to the collector of the controlled bipolar junction transistor; or
the output feedback circuit is a second current sensitive element coupled to the collector of the controlled bipolar junction transistor, the second current sensitive element being configured to sense the feedback signal when a current flows therethrough.

21. The protection device of claim 20, wherein the current sensitive element is an optocoupler.

22. The method of claim 12, wherein
if it is found that the length of time for which a signal is abnormal is greater than a threshold, issuing a fault alert associated with the corresponding interface, wherein the threshold is greater than the first diagnosis time period, or greater than the sum of the first diagnosis time period and the second diagnosis time period.

23. The method of claim 12, wherein the first diagnosis time period and second diagnosis time period are much smaller than the duration of the signal.

24. The method of claim 13, wherein
if it is found that the length of time for which a signal is abnormal is greater than a threshold, issuing a fault alert associated with the corresponding interface, wherein the threshold is greater than the first diagnosis time period, or greater than the sum of the first diagnosis time period and the second diagnosis time period.

25. The method of claim 13, wherein the first diagnosis time period and second diagnosis time period are much smaller than the duration of the signal.

* * * * *